(12) United States Patent
Kojima et al.

(10) Patent No.: US 11,282,040 B2
(45) Date of Patent: Mar. 22, 2022

(54) EVALUATION DEVICE, EVALUATION METHOD, EVALUATION PROGRAM, AND EVALUATION SYSTEM

(71) Applicant: IMatrix Holdings Corp., Kawasaki (JP)

(72) Inventors: Mitsuo Kojima, Kanagawa (JP); Hibiki Oka, Kanagawa (JP)

(73) Assignee: IMATRIX HOLDINGS CORP., Kawasaki (JP)

( * ) Notice: Subject to any disclaimer, the term of this patent is extended or adjusted under 35 U.S.C. 154(b) by 35 days.

(21) Appl. No.: 16/463,783

(22) PCT Filed: Nov. 28, 2016

(86) PCT No.: PCT/JP2016/085144
§ 371 (c)(1),
(2) Date: May 23, 2019

(87) PCT Pub. No.: WO2018/096672
PCT Pub. Date: May 31, 2018

(65) Prior Publication Data
US 2019/0378091 A1    Dec. 12, 2019

(51) Int. Cl.
| G06Q 10/10 | (2012.01) |
| G06F 16/955 | (2019.01) |
| G06F 16/248 | (2019.01) |
| H04L 41/026 | (2022.01) |
| H04L 51/00 | (2022.01) |
| H04L 51/42 | (2022.01) |

(52) U.S. Cl.
CPC ......... *G06Q 10/107* (2013.01); *G06F 16/248* (2019.01); *G06F 16/9566* (2019.01); *H04L 41/026* (2013.01); *H04L 51/12* (2013.01); *H04L 51/22* (2013.01)

(58) Field of Classification Search
CPC ...... G06F 16/9566; G06F 16/24; G06F 13/00; G06F 16/39566; G06F 16/248; G06N 20/00; G06Q 10/17; H04L 51/12; H04L 51/22; H04L 41/0206
USPC ......................................................... 709/206
See application file for complete search history.

(56) References Cited

U.S. PATENT DOCUMENTS

| 2009/0187986 A1* | 7/2009 | Ozeki ..................... G06F 21/36 726/21 |
| 2010/0161748 A1 | 6/2010 | Kojima et al. |
| 2012/0249535 A1* | 10/2012 | Castineiras ............. G06T 19/00 345/419 |
| 2013/0278501 A1* | 10/2013 | Bulzacki ............... G06F 3/0304 345/157 |

(Continued)

FOREIGN PATENT DOCUMENTS

| JP | 2011090442 A | 5/2011 |
| JP | 5121828 B2 | 1/2013 |

*Primary Examiner* — Sibte H Bukhari
(74) *Attorney, Agent, or Firm* — Slater Matsil, LLP (57) ABSTRACT

An evaluating method can be performed by a computer. The method includes acquiring two-dimensional data represented by a plurality of character types, converting the two-dimensional data to three-dimensional data by classifying the acquired two-dimensional data into a dimension of the plurality of character types, analyzing a feature of the three-dimensional data, and evaluating input data described in the plurality of character types based on the analyzed feature.

11 Claims, 8 Drawing Sheets

(56) References Cited

U.S. PATENT DOCUMENTS

2015/0221077 A1* 8/2015 Kawabata ............... G06T 7/337
382/141

* cited by examiner

| CHARACTER | DIMENSION |
|---|---|
| a | 0 |
| b | 1 |
| c | 2 |
| ... | ... |
| { | 67 |
| } | 68 |

EVALUATION DEVICE, EVALUATION METHOD, EVALUATION PROGRAM, AND EVALUATION SYSTEM

CROSS-REFERENCE TO RELATED APPLICATIONS

This patent application is a national phase filing under section 371 of PCT/JP2016/085144, filed Nov. 28, 2016, which is incorporated herein by reference in its entirety.

TECHNICAL FIELD

The present invention relates to evaluation devices for mechanically evaluating various text data and, in particular embodiments, to methods for identifying whether or not document data of electronic mail corresponds to spam (unsolicited bulk e-mail).

BACKGROUND

A method for eliminating spam includes: pre-entering judgement information for judging whether spam is or not, such as keywords, sender addresses and URLs, on a mail server who delivers electronic mail to a receiver; and categorizing a received electronic mail to spam to delete and/or stop delivering it to users if the received electronic mail includes the judgement information. Also, a method includes filtering electronic mail having specific addresses or keywords as spam on a user terminal according to filter rules set by a user himself.

For example, Japanese patent document JP512182813 discloses extracting appearance information (such as the number of lines of electronic mail, attachments, the form of electronic mail, and the language of electronic mail etc.) as outline information indicating an appearance feature of electronic mail. The appearance information excludes a main text of electronic mail, sender/source addresses, and receiver/reception addresses. An external control center is required to send spam detection information for detecting spam based on the extracted outline information. The electronic mail is determined as spam if the content of the electronic mail corresponds to corresponding spam detection information. The external control center is required to update the spam detection information by sending the outline information if the electronic mail is not determined as spam.

Also, Japanese patent document JP2011-90442A discloses an electronic mail sorting device which reduces throughput for eliminating spam and operational burden of users. Specifically, a feature vector indicating a feature of electronic mail is acquired based on header information of the electronic mail to create a categorization rule for categorizing whether the electronic mail is spam or not by using the feature vector as learning data.

SUMMARY

Conventionally, methods for detecting or sorting spam have been studied. For example, a method was developed in which an analysis of text data is performed by applying natural language analysis to spam to determine whether an input text is spam or not.

In one method, text data is analyzed by using a data structure of natural language referred to as "Bag-of-Words", in which evaluation words are predetermined to use the presence/absence of such words as data. The method has problems that un-predetermined words are not used since the presence/absence of predetermined words is determined, and order information such as the order of words is not taken into consideration. In another method, text data is analyzed by using a data structure of natural language referred to as "N-gram", in which text data is divided every N letter(s) and the presence/absence thereof is used as data. The method has problems that the meaning of words is not taken into consideration in the data structure since a word is divided by a certain number of letter(s) N, and order information such as the order of words is not taken into consideration as in the case with "Bag-of-Words". In yet another method, text data is analyzed by using a data structure of natural language referred to as "distributed representation", in which words are vectorized by mechanical learning. In the method, while it is easier to analyze the meaning of text data, it is more difficult to use un-predetermined words.

There are problems for using these data structures to detect spam. In "Bag-of-Words" and "distributed representation", the analysis may be difficult if character strings of spam have a high degree of freedom. In "N-gram", the accuracy of detection may be reduced due to random character strings of spam. For example, in the first case, a character string representing a random domain such as "dws8m7rf.com", a character string changing a correct word (e.g., drug) to "dr*g", or a delimiting character string separating a main text such as "_NextPart_000_0016_465EED20" from attachments etc. are used in mail header. Since these character strings have a high degree of randomness and freedom, it is generally impossible to previously provide a dictionary having these character strings.

Such conventional problems may be solved by the present invention. It is intended to provide an evaluation device, an evaluation method, an evaluation program, and an evaluation system for evaluating input text data by using a data structure in which text data such as mail document is binarized on a per character type basis.

An evaluation device according to the present invention includes an acquisition unit for acquiring m rows×n columns sample data, a conversion unit for extracting character types I from the sample data to convert the sample data to three-dimensional data with m rows×n columns×character types I, a learning unit for learning a feature of the three-dimensional data converted by the conversion unit, and an evaluation unit for evaluating input data based on the feature learned by the learning unit. Preferably, the input data is text data with m rows×n columns.

An evaluation device according to the present invention further includes an acquisition unit for acquiring two-dimensional data represented by a plurality of character types; a conversion unit for converting the two-dimensional data to three dimensional data by classifying the acquired two-dimensional data into a dimension of the plurality of character types; an analysis unit for analyzing a feature of the three-dimensional data; and an evaluation unit for evaluating input data described in the plurality of character types based on the feature analyzed by the analysis unit.

Preferably, an evaluation device further includes a converting unit for converting the input data to three-dimensional input data by classifying the input data to a dimension of the plurality of character types. The evaluation unit evaluates the input data by comparing a feature of the three-dimensional input data with the feature analyzed by the analysis unit. Preferably, the evaluation unit evaluates whether the input data is spam or not.

An evaluation system according to the present invention includes a learning unit for learning a feature of text data; and an evaluation unit for evaluating the text data. The learning unit includes an acquisition unit for acquiring two-dimensional data represented by a plurality of character types from data base; a conversion unit for converting the two-dimensional data to three-dimensional data by classifying the acquired two-dimensional data into a dimension of the plurality of character types; a learning unit for analyzing and learning a feature of the three-dimensional data. The evaluation unit includes a converting unit for converting input data to three-dimensional input data by classifying the input data to be evaluated to a dimension of the plurality of character types; and an evaluation unit for evaluating the input data by comparing a feature of the three-dimensional input data converted by the conversion unit with the feature learned by the learning unit. Preferably, the evaluation unit is provided on a mail server.

Effect of the Invention

According to the present invention, text data of mail documents etc. is converted to three-dimensional data with a dimension of character types to analyze and learn a feature of the three-dimensional data so that character strings which are conventionally not used due to a high randomness may be processed and structure information may be provided. Further, deep learning and/or various conventional image processing methods may be applied to three-dimensional data since it has the same structure as image. Further, converting text data to such structure allows spam with a high randomness to be accurately distinguished.

The following reference numerals can be used in conjunction with the drawings: the
  1: mail processing device
  2: learning system
  3: evaluation system
  4: text input unit
  5: data conversion unit
  6: learning unit
  7: learning model
  8: text input unit
  9: data conversion unit
  10: evaluation unit
  11: storage unit
  12: mail
  13: spam
  14: normal mail
  20: text data evaluation device

DETAILED DESCRIPTION OF ILLUSTRATIVE EMBODIMENTS

Now, embodiments according to the present invention will be described in detail with reference to the drawings. In a preferred embodiment, an evaluation device according to the present invention may be implemented as a text data evaluation device. In a further preferred embodiment, the evaluation device may be implemented as a mail processing device. The mail processing device may be connected to a network such as the internet or intranet. The mail processing device may receive electronic mail via the network to analyze the received electronic mail to determine whether it is spam or not. The mail processing device may be provided at least with a mail processing function. The mail processing device may be provided with another function implemented by hardware or software. The mail processing device may be another electronic device such as a server, a computer, an electronic device, a terminal device, and a mail delivery server.

Figure 1:
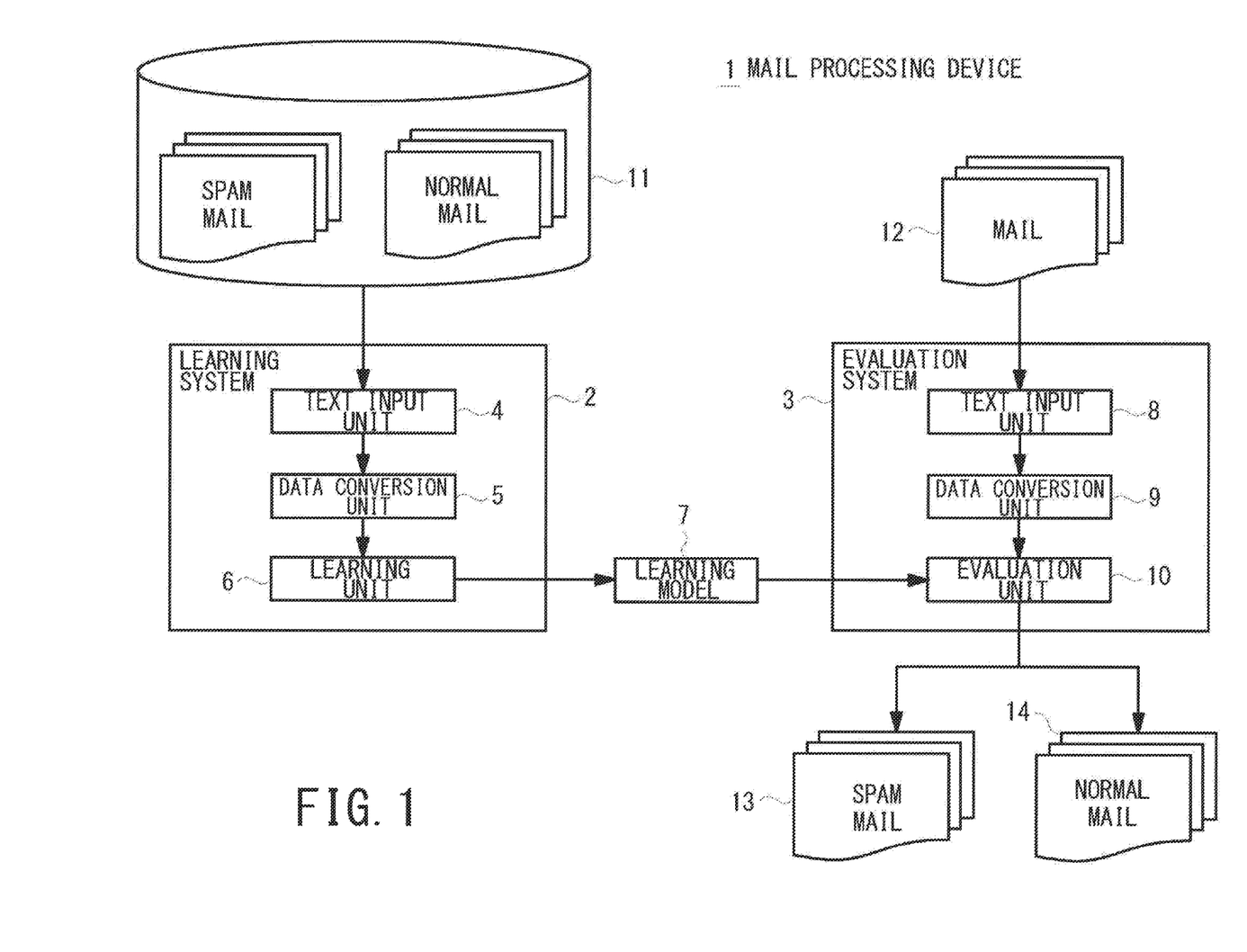
FIG. 1 is a block diagram showing a functional structure of a mail processing device according to an embodiment of the present invention.

FIG. 1 is a block diagram showing a functional structure of a mail processing device according to an embodiment of the present invention. A mail processing device 1 includes a learning system 2 and an evaluation system 3. The learning system 2 includes a text input unit 4, a data conversion unit 5, and a learning unit 6. The evaluation system 3 includes a text input unit 8, a data conversion unit 9, and an evaluation unit 10. The learning system 2 acquires text data from a data base 11 in which text data of spam and normal mail etc. is collected and stored to build a learning model 7. The evaluation system 3 evaluates mail to be evaluated 12 based on the learning model 7 to distinguish between spam 13 and normal mail 14. Spam is mail (email) such as unsolicited bulk e-mail etc. which is indiscriminately delivered. Normal mail is mail (email) which is generally used in a society such as exchanges between acquaintances or use in business. The learning system 2 and the evaluation system 3 may be respectively implemented on a computer, a server or a host which are physically-separated. Or, they may be implemented on a same computer, server or host.

The mail processing device 1 may be composed of, for example, one or more computer devices, or one or more servers. Each function provided in the mail processing device 1 may be implemented by a computer device or a server which are separated. In such case, the computer device and the server may be connected via a network. For example, while the evaluation system 3 inputting the mail 12 is placed in a mail server, the learning system 2 is connected to the evaluation system via a network. Thus, learning results from the learning model 7 may be provided.

The learning system acquires text data used as sample from the data base ii and performs a data conversion according to a certain rule to build a learning model. The data base 11 stores spam acquired by using honeypot technology, normal mail, and text data which should be learned by the learning system 2, etc. The text input unit 4 acquires text data from the data base 11. The data conversion unit 5 converts the text data acquired by the text input unit 4.

Figure 2:
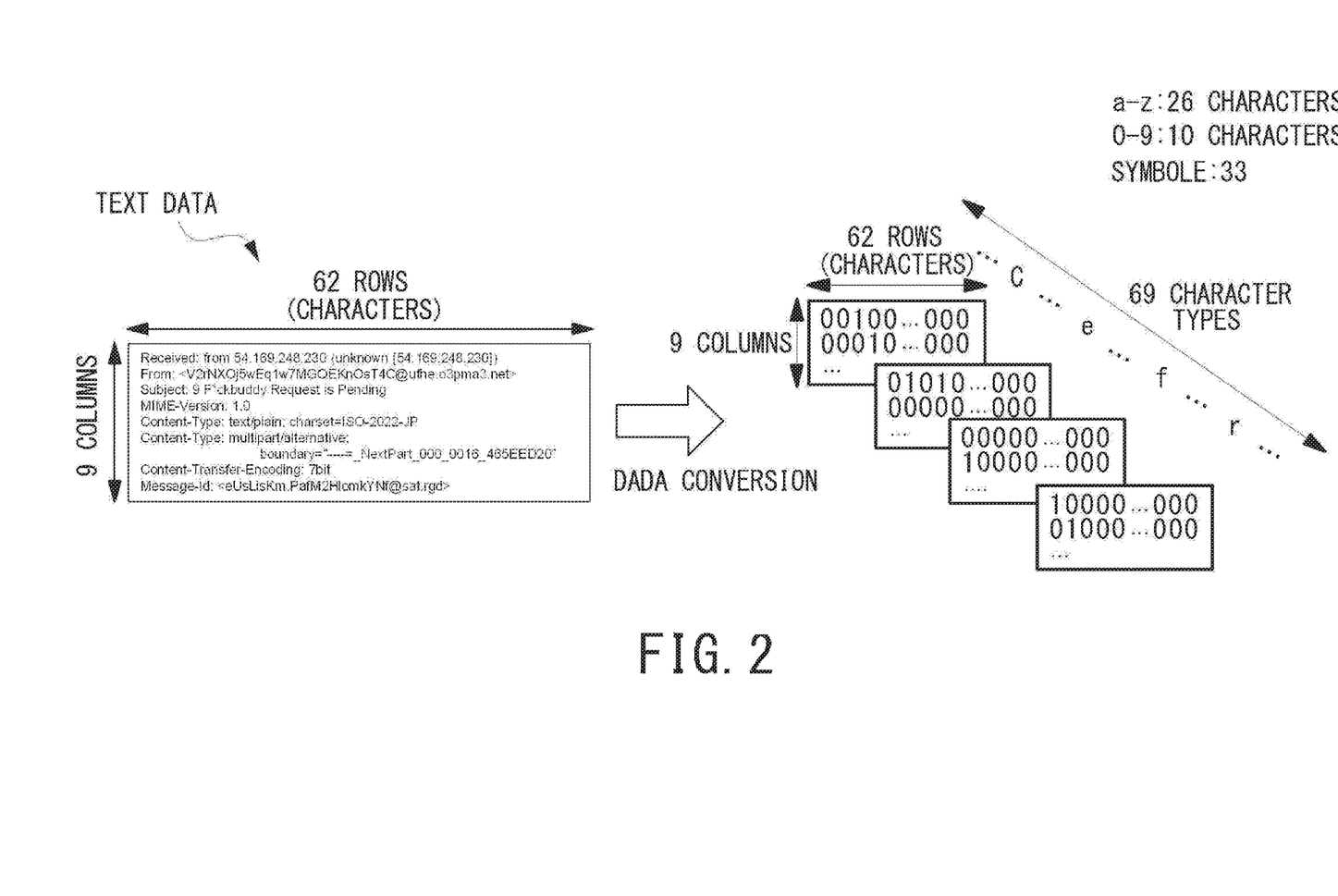
FIG. 2 is a diagram explaining a conversion of text data by a data conversion unit according to an embodiment of the present invention.

FIG. 2 is a diagram explaining a conversion of text data by the data conversion unit 5 according to an embodiment of the present invention. In this diagram, an example of a data conversion for text data in the size 9 rows×62 columns is shown as an example of mail header. The data conversion unit 5 conceptually classifies text data by dimensions of predetermined character types. In one example, character types are defined as totally 69 kinds of character types which include 26 types of the alphabets a-z, 10 types of 0-9, and 33 types of multiple symbols. The data conversion unit 5 converts a position of a row/column with a character of each dimension to data "1" and converts a position of a row/column without a character to data "o". For example, in the example of this diagram, "c" of "Received" is existed at 1st row×3rd column, thus "1" is set at 1st row×3rd column in the dimension "c". "e" is existed at 1st row×4th column, thus "1" is set at 1st row×4th column in the dimension "e".

Figure 3:
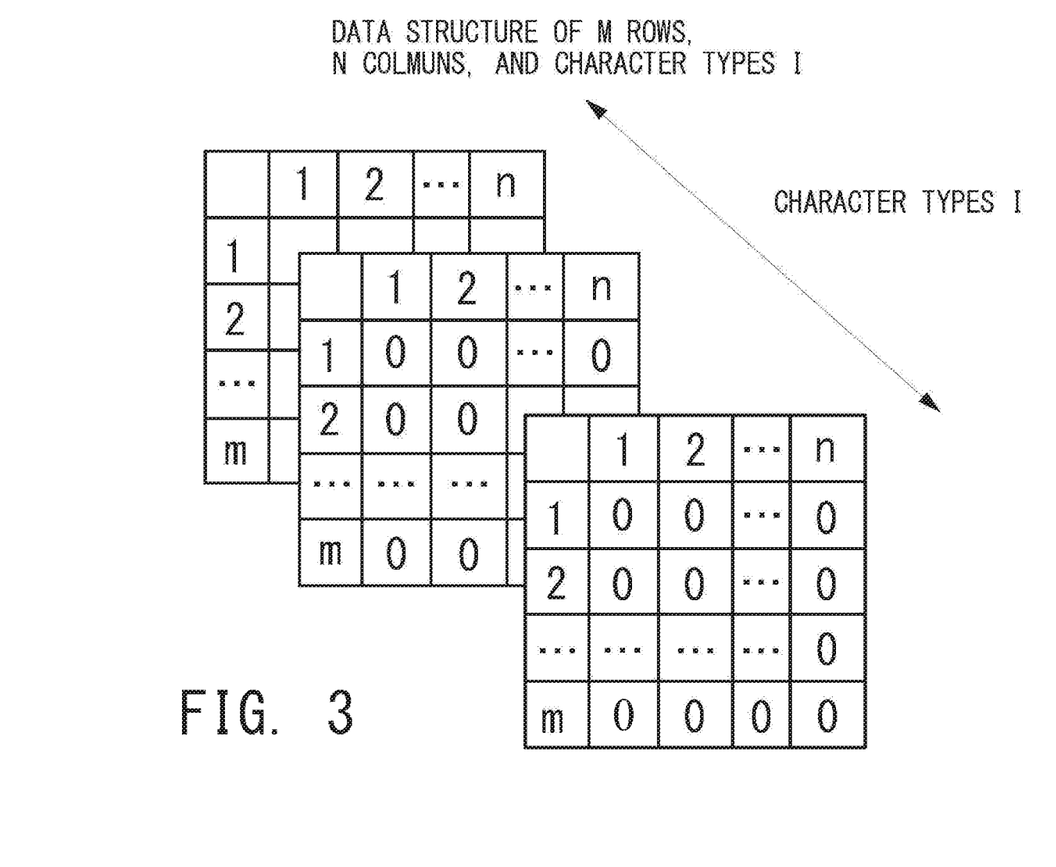
FIG. 3 is a diagram showing a three-dimensional data structure according to an embodiment of the present invention.

Thus, the data conversion unit 5 converts text data in each dimension of character types of text data to create data "1" in the corresponding positions of row/column. If one text data has the size m rows×n columns and the character type included therein is I, thus the data conversion unit 5 converts the text data to a three-dimensional data format which has m rows×n columns and depth I, as shown in FIG. 3. It is optional how to determine character types. For example, kanji character, hiragana character, katakana character, Russian character, and French character may be used. Further, Capital letter and lowercase letter may be distinguished in character types.

The data conversion unit 5 may compress the dimension I of character types. For example, the above-described 33 types of symbols may be used as one type of same symbols, or 26 types of a-z may be divided into 7 types such as a-d, e-h, i-l, m-p, q-t, u-x, and y-z to compress the dimension I to 7 types. For the compression, continuous character types are not always grouped to one group. Discrete character types may be grouped to one group and the number of character types included in each of groups may be different. For example, character types which are not used very much may be grouped to one group and compressed, or the dimension I of the character type I may be compressed according to predetermined rule or the degree of importance. The dimension I may be compressed by the way of dimensionality compression such as principal component analysis and autoencoder.

Figure 4:
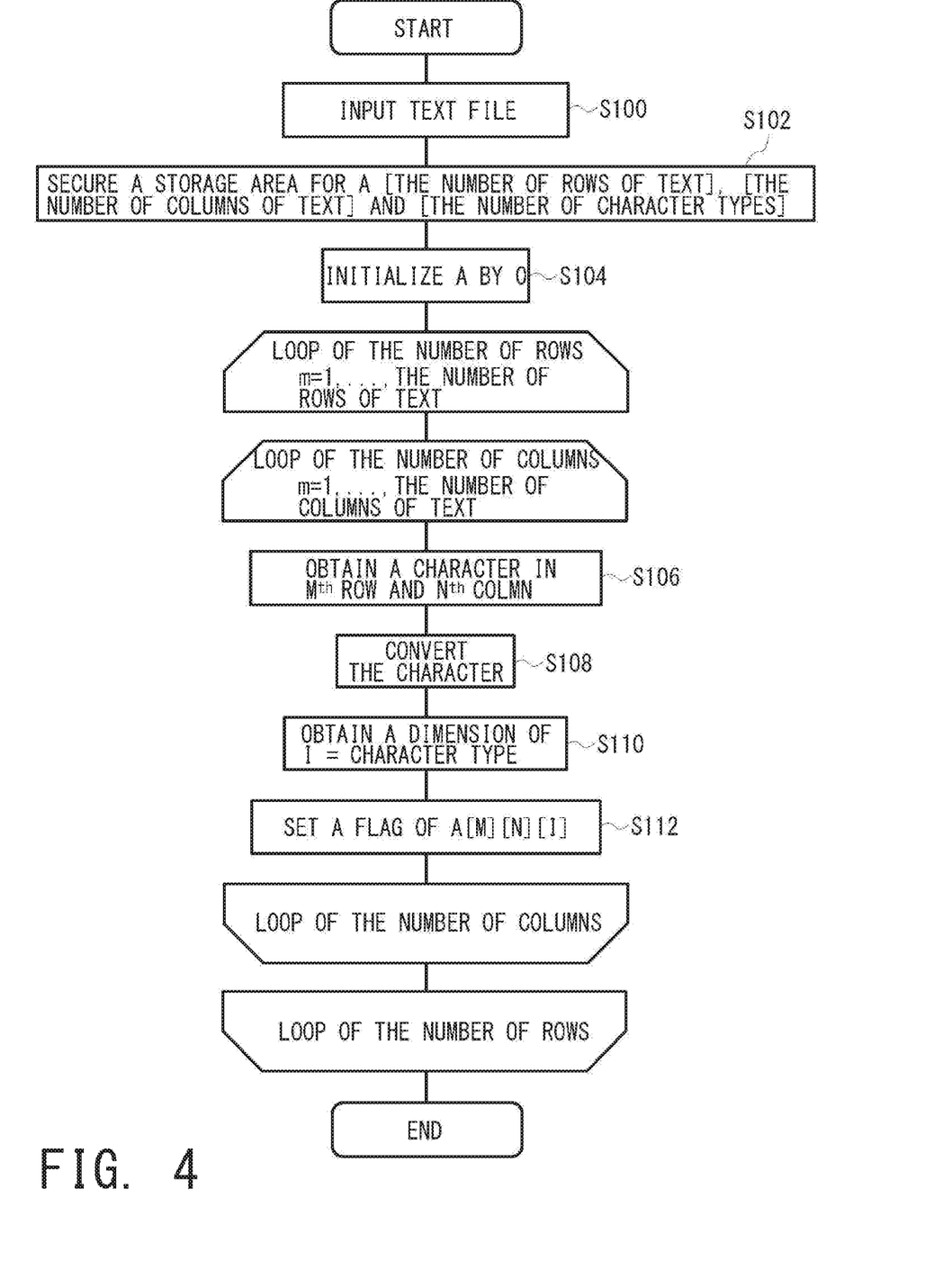
FIG. 4 is a flowchart showing an operation of a text input unit and data conversion unit according to an embodiment of the present invention.

FIG. 4 is a flowchart showing the operation of the text input unit and the data conversion unit according to an embodiment of the present invention. First, the learning system 2 inputs text data to be converted (including text files with a plurality of text data) by the text input unit 4 (S100). The data conversion unit 5 secures, on storage area of the mail processing device 1, an area for expanding A "the number of rows of text", "the number of columns of text" and "the number of character types" (S102). A "the number of rows of text", "the number of columns of text" and "the number of character types" mean data A which is specified by three elements of "the number of rows of text", "the number of columns of text" and "the number of character types". Three-dimensional data shown in FIG. 3 may be data A. "The number of rows of text" and "the number of columns of text" are shown in numbers. "The number of character types" is shown in numbers which are previously assigned by a dimension of each character type. After securing the storage area for data A, data A is initialized (S104).

Then, the data conversion unit 5 performs a data conversion such that text data with m rows×n columns may be scanned every one letter, for example. In this example, characters in $m^{th}$ row (m=1, 2, 3 . . . , the number of rows of text) are acquired in the column order. All of characters in $n^{th}$ column (n=1, 2, 3 . . . , the number of columns of text) is acquired followed by moving to the next line. Loop processing is performed again in which characters are acquired in the column order.

Figure 5:
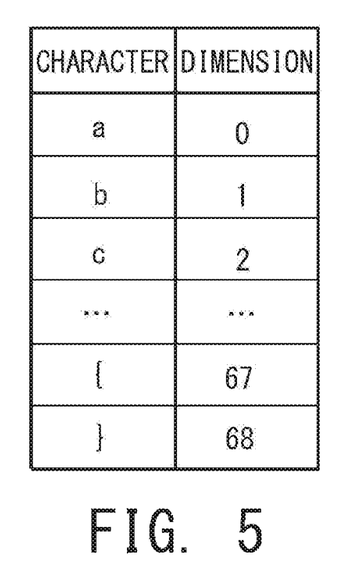
FIG. 5 is a diagram showing correspondences between characters and dimensions.

The data conversion unit 5 acquires a character at $m^{th}$ row×$n^{th}$ column first (S106) and converts the acquired character to data or code recognizable by computer (S108). Then, a dimension I of character types acquired in S106 is acquired according to the table shown in FIG. 5 (S110). A flag "1" is set at $m^{th}$ row×$n^{th}$ column in the dimension I (S112). The processes from S106 to S112 are repeated by loop processing.

Figure 6:
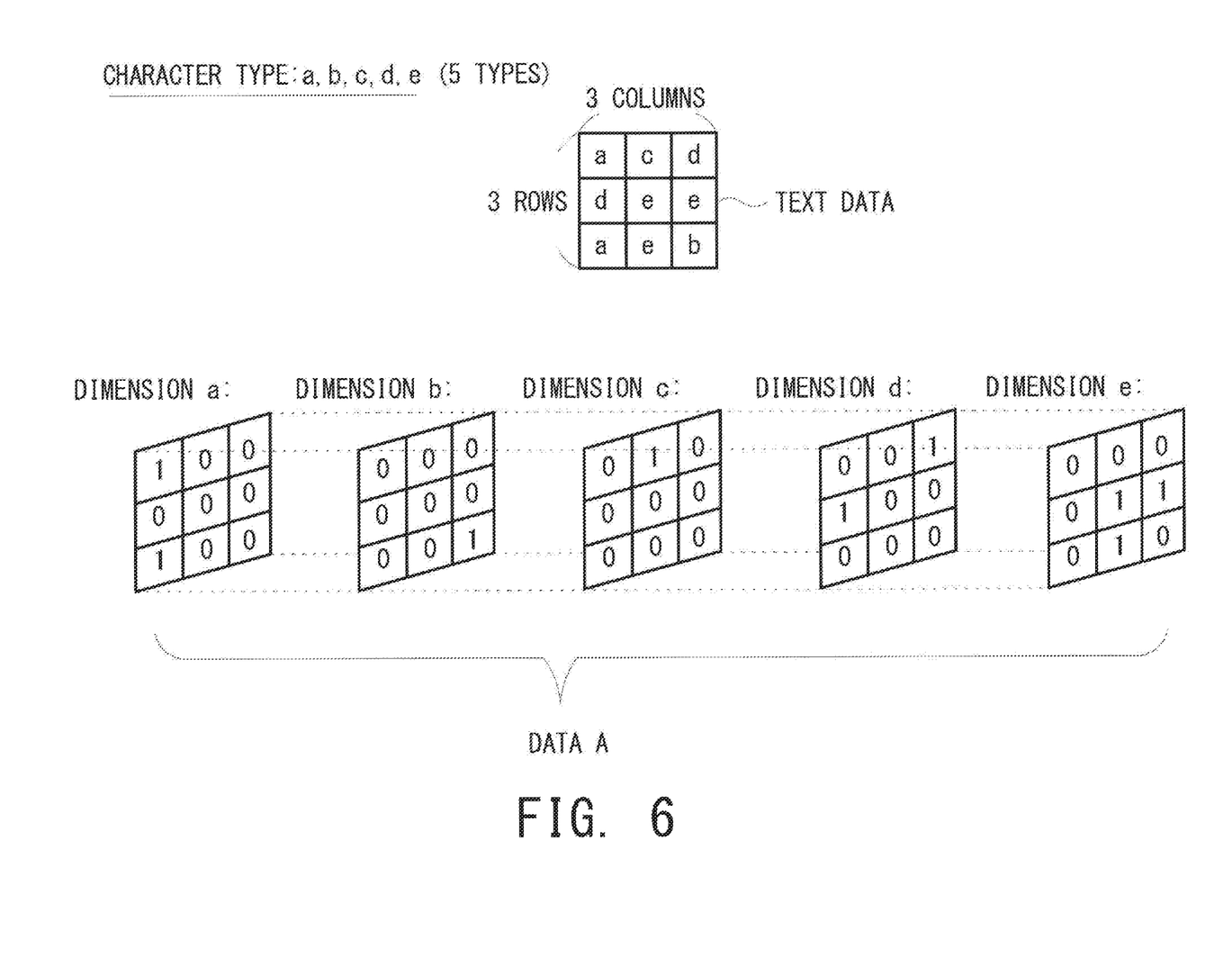
FIG. 6 is a diagram showing a specific embodiment of a processing flow shown in FIG. 4.

FIG. 6 is a diagram showing a specific example of processing flow of FIG. 4. In this figure, for the sake of simplicity, text data is composed of 3 rows×3 columns, and character types are 5 types of a, b, c, d, and e, and such text data is converted by the data conversion unit 5. 1st row is scanned by the data conversion unit 5. In other words, "a" at 1st row×1st column, "c" at 1st row×2nd column, and "d" in 1st row and 3rd column are converted. Then, 2nd row is scanned, wherein "d" in 2nd row and 1st column, "e" in 2nd row and 2nd column, and "e" in 2nd row and 3rd column are converted. At last, 3rd row is scanned, wherein "a" in 3rd row and 1st column, "e" in 3rd row and 2nd column, and "b" in 3rd row and 3rd column are converted. Thus, the processes from S106 to S112 are repeated and finally data A is output.

Figure 7:
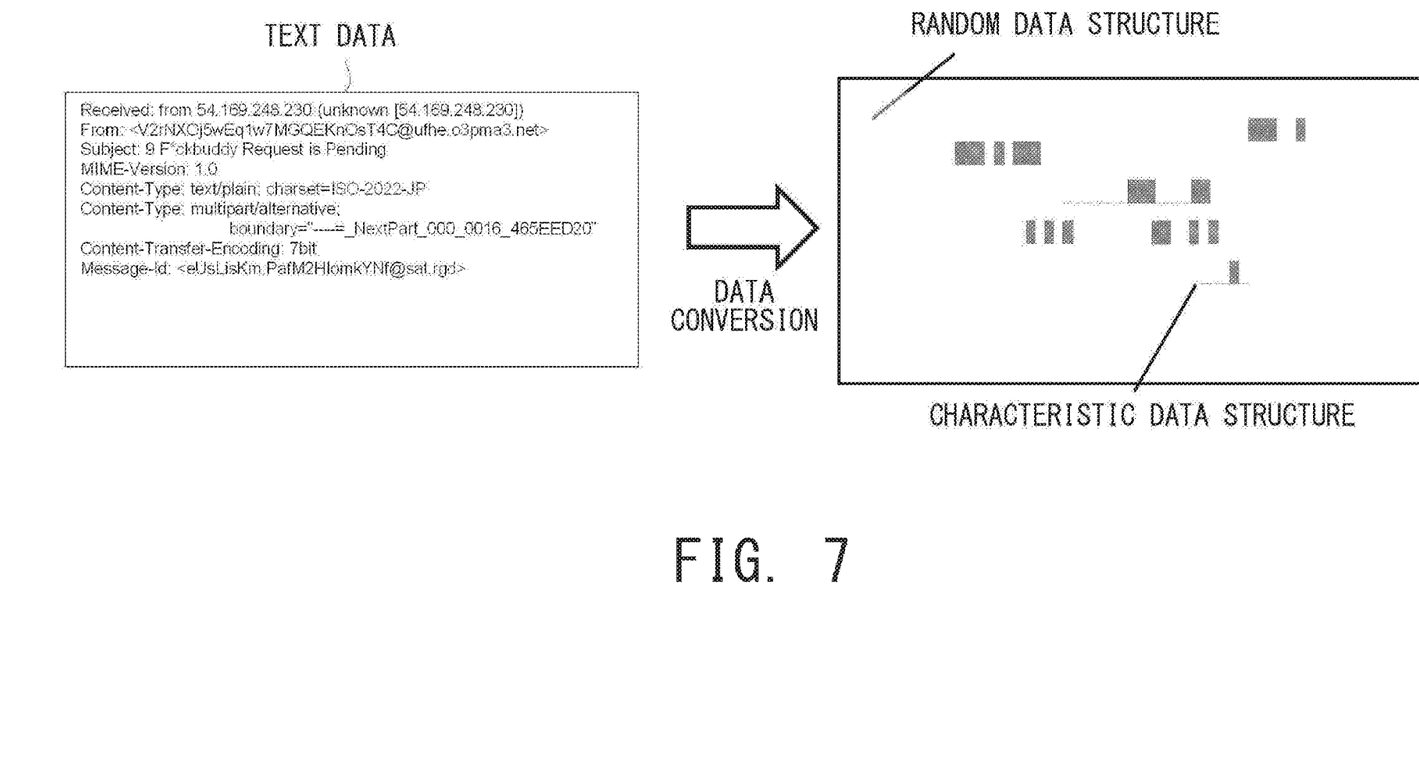
FIG. 7 is a diagram illustrating a characteristic data structure specified by a learning system.

The learning unit 6 retrieves three-dimensional data converted by the conversion unit 5 to learn them. Learning means conventionally-used mechanical learning such as deep learning, wherein any number of text data converted by the data conversion unit 5 may be acquired and a feature of the text data is extracted to analyze and classify spam and normal mail. FIG. 7 shows an example of a characteristic data structure acquired when converting text data of mail header. As converted data is learned, characteristic points, for example, points in which a same character string is used, are extracted in random text data, thus a characteristic data structure is provided. Every time the learning unit 6 acquires spam and normal mail, it learns such characteristic data structure. The characteristic data learned by the learning unit 6 is provided to the evaluation system 3 as the learning model 7.

The evaluation system 3 inputs the mail to be evaluated 12 (text data), performs a data conversion of the mail by using the same algorithm as the learning system 2, and evaluates whether the input mail is spam or normal mail by using the learning model.

The text input unit 8 inputs the mail to be evaluated 12. The timing of the text input unit 8 inputting mail to be evaluated is not specifically determined. For example, mail to be evaluated may be stored such that the text input unit 8 is performed at a timing of a certain number of mail being stored. Or, stored mail may be input at a timing such as every day, every week, and every month, etc. The input may be performed at a timing instructed by a user of the mail processing device 1 from external. The data conversion unit 9 converts text data by using the same algorithm as the above-described data conversion unit 5.

The evaluation unit 10 evaluates text data converted by the data conversion unit 9 based on the learning model provided by the learning system 2. In this embodiment, the input mail 12 is evaluated whether it is spam or normal mail. In the learning model 7, the features for determining spam such as the feature of spam learned by the learning system 2 and the difference from normal mail etc. are modeled. The evaluation unit 10 compares the feature of the mail to be evaluated 12 which is converted by the same algorithm as the learning system 2 with the feature provided by the learning model 7, evaluates if they are match or approximate, and classifies the mail 12 to spam or normal mail 14 based on the evaluation.

In the above-described embodiment, the evaluation for spam or normal mail is performed by way of mail header. However, this is just an example and text data other than mail header may be evaluated. Further, the present invention may be applied to text analyses with a high degree of randomness and freedom, such as data headers, communication commands, communication packets, or a program itself.

Figure 8:
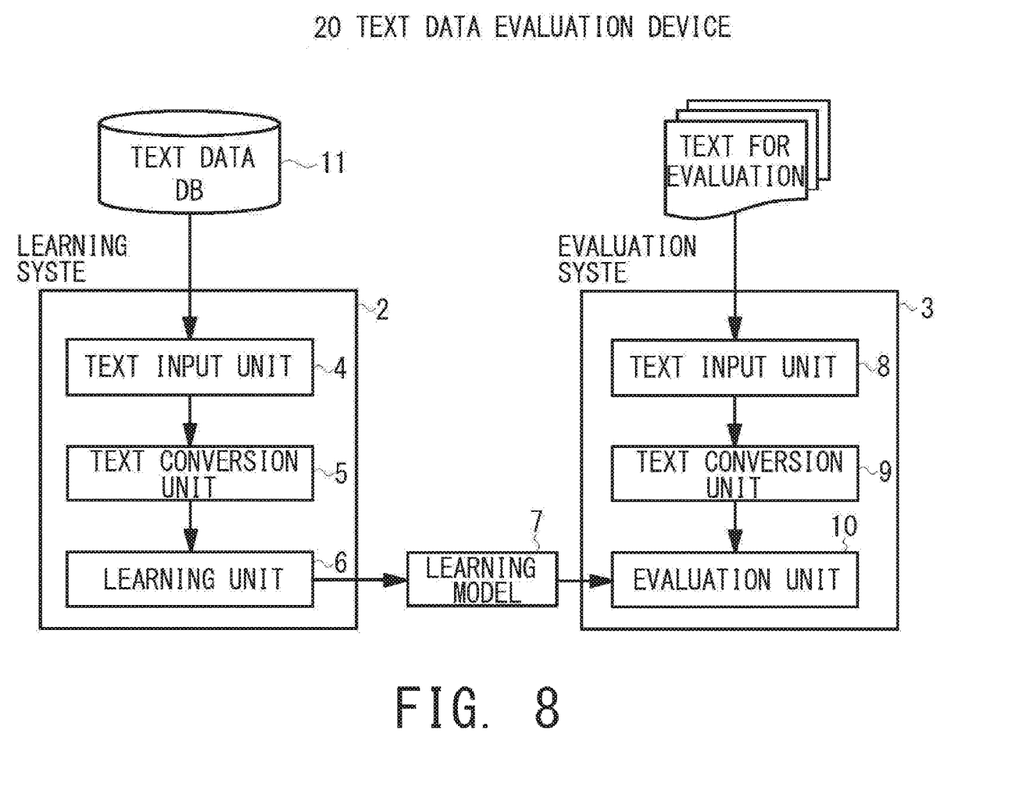
FIG. 8 is a diagram showing a text data evaluation device that a mail processing device is generalized, according to an embodiment of the present invention.

FIG. 8 is a diagram showing a structure of a text data evaluation device according to the present invention. The text data evaluation device evaluates not only mail described above, but also any text data or any document data. That is, while the mail processing device 1 shown in FIG. 1 learns spam and normal mail to evaluate whether input mail is spam or normal mail, the text data evaluation device 20 may evaluate mail from various elements and/or viewpoints of text data and document data by using similar technique. For example, text data written by a specific person (a book written by an author, etc.) is input to the storage unit 11, a data conversion is performed by the data conversion unit 5, and the feature of the text written by the specific person is built as the learning model 7. By performing such learning, inputting any evaluation text to the evaluation system 3 allows for evaluating whether or not such evaluation text is written by a specific person or not by comparison with the learning model 7. Further, if a plurality of text data written by various people are input to the learning system 2, who the evaluation text 12 wrote may be evaluated. This allows for grouping mail automatically.

The mail processing device 1 according to an embodiment of the present invention allows for using character strings with a high degree of randomness which are difficult to use in conventional spam removal methods. Thus, spam may be appropriately removed even if spam in which a portion thereof is modified is delivered. Further, a structure of one text data may be retained as structure information as shown in FIGS. 2 and 3. Further, since a data structure according to an embodiment of the present invention has the same structure as image, it may be combined with deep learning which uses images, so that many conventional image processing methods may be applied.

The preferred embodiments of the present invention are above-described in detail. The present invention is not limited to specific embodiments. Various modifications and alternations are possible within main points of the invention described in claims.

What is claimed is:

1. An evaluation device comprising:
a non-transitory computer readable memory;
a processor;
an acquisition unit for acquiring two-dimensional data represented by a plurality of character types, wherein there are I character types, I being an integer;
a conversion unit for converting the two-dimensional data to three-dimensional data by classifying the acquired two-dimensional data into a dimension of the plurality of character types, wherein the conversion unit is configured to compress the I character types to a dimension that has a lower number than the I character types to generate a compressed three-dimensional data;
an analysis unit for analyzing a feature of the three-dimensional data; and
an evaluation unit for evaluating input data described in the plurality of character types based on the feature analyzed by the analysis unit.

2. The evaluation device of claim 1 further comprising a converting unit for converting the input data to three-dimensional input data by classifying the input data into a dimension of the plurality of character types, wherein the evaluation unit is configured to evaluate the input data by comparing a feature of the three-dimensional input data with the feature analyzed by the analysis unit.

3. The evaluation device of claim 1, wherein the input data is electronic mail data and the evaluation unit is configured to evaluate whether the input data is or is not spam.

4. An evaluation system comprising:
a non-transitory computer readable memory;
a processor;
a learning module for learning a feature of text data; and
an evaluation module for evaluating the text data,
wherein the learning module comprises:
an acquisition unit for acquiring two-dimensional data represented by a plurality of character types from data base, wherein there are I character types, I being an integer;
a conversion unit for converting the two-dimensional data to three-dimensional data by classifying the acquired two-dimensional data into a dimension of the plurality of character types, wherein the conversion unit is configured to compress the I character types to a dimension that has a lower number than the I character types to generate a compressed three-dimensional data; and
a learning unit for analyzing and learning a feature of the three-dimensional data; and
the evaluation module comprises:
a converting unit for converting input data to three-dimensional input data by classifying the input data to be evaluated into a dimension of the plurality of character types; and
an evaluation unit for evaluating the input data by comparing a feature of the three-dimensional input data converted by the conversion unit with the feature learned by the learning unit.

5. The evaluation system of claim 4, wherein the evaluation module is provided on a mail server.

6. The evaluation system of claim 5, wherein the input data is electronic mail data and the evaluation unit is configured to evaluate whether the input data is or is not spam.

7. An evaluating method performed by a computer, the method comprising:
acquiring two-dimensional data represented by a plurality of character types, wherein acquiring the two-dimensional data comprises acquiring m rows×n columns of sample data, where m and n are integers;
converting the two-dimensional data to three-dimensional data by classifying the acquired two-dimensional data into a dimension of the plurality of character types, wherein converting the two-dimensional data to three-dimensional data comprises extracting I character types from the sample data to convert the sample data to three-dimensional data with m rows×n columns×character types I, where I is an integer;
analyzing a feature of the three-dimensional data; and evaluating input data described in the plurality of character types based on the analyzed feature.

8. The method of claim 7, wherein evaluating the input data comprises receiving electronic mail data and determining whether the electronic mail data includes spam.

9. A non-transitory storage medium storing an evaluation program that can be performed by a computer, the evaluation program causing the computer to perform the steps of:
acquiring two-dimensional data represented by a plurality of character types, wherein acquiring the two-dimensional data comprises acquiring m rows×n columns of sample data, where m and n are integers;
converting the two-dimensional data to three-dimensional data by classifying the acquired two-dimensional data into a dimension of the plurality of character types wherein converting the two-dimensional data to three-dimensional data comprises extracting I character types from the sample data to convert the sample data to three-dimensional data with m rows×n columns x character types I, where I is an integer;
analyzing a feature of the three-dimensional data; and
evaluating input data described in the plurality of character types based on the analyzed feature.

10. The evaluation device of claim 1, wherein the two-dimensional data is arranged as m rows×n columns of data, where m and n are integers; and
wherein the three-dimensional data is arranged as m rows×n columns×I character types.

11. The evaluation device of claim 10, wherein the input data is text data with m rows×n columns.

* * * * *